S. D. FIELD.

Dynamo Electric Machine.

No. 9,458. Reissued Nov. 9, 1880.

WITNESSES:

Wm. Arnoux

R. S. Guernsey

INVENTOR

Stephen D. Field per C. de Buckingham

ATTORNEY

UNITED STATES PATENT OFFICE.

STEPHEN D. FIELD, OF NEW YORK, N. Y.

DYNAMO-ELECTRIC MACHINE.

SPECIFICATION forming part of Reissued Letters Patent No. 9,458, dated November 9, 1880.

Original No. 223,845, dated January 27, 1880. Application for reissue filed July 27, 1880.

*To all whom it may concern:*

Be it known that I, STEPHEN D. FIELD, formerly of the city and county of San Francisco, in the State of California, and now of New York, county of New York, State of New York, have invented an Improvement in Dynamo-Electric Machines for Telegraphic Purposes; and I do hereby declare that the following is a full, clear, and exact description thereof, reference being had to the accompanying drawings.

Figure 1:
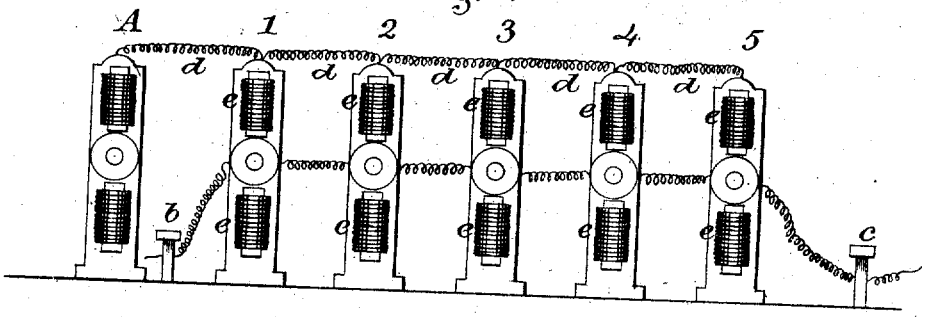
Figure 2:
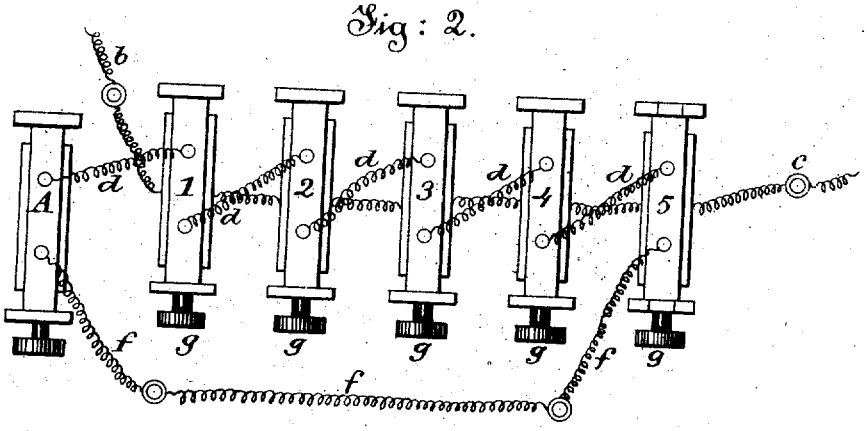

Figure 1 represents an elevation, and Fig. 2 a plan view, of a series of machines arranged as will be hereinafter set forth.

The chief obstacle heretofore met in employing magneto or dynamo electric machines for telegraphic purposes has been that a sensible variation in the current generated by such machines is occasioned by slight irregularities in the speed at which they are driven. I propose to overcome this obstacle, if not entirely, to at least lessen it, so as to render it inappreciable.

If, instead of one single generator, several be used in developing a current, the variation of intensity due to irregularity in the velocity of rotation in any one of them is only a fractional part of what it would be if the current were generated by a single machine subject to like irregularities in its speed of rotation, and such diminished or fractional part of the whole current becomes smaller as the number of machines is increased. If a single machine were employed as a generator any irregularity in the speed of its rotating armature would effect an irregularity in the current generated fully commensurate with the irregularity or variation of speed of rotation. Thus it may be supposed that a variation of one hundred rotations a minute, in case a single machine were used, would cause a variation from its normal amount or unit of twenty-five per cent., above or below, or a fluctuation from seventy-five to one hundred and twenty-five per cent.; whereas if a series of five machines were employed the armatures of all the machines being driven each independently of all the others, an irregularity of one hundred revolutions above or below the normal speed per minute in the rotation of any one armature would not cause a fluctuation from seventy-five to one hundred and twenty-five per cent., or from three-fourths to five-fourths of the normal tension, for a single machine of the series, if wholly stopped, would affect the tension of the current due to the whole series by only one-fifth or twenty per cent. Therefore, if a single machine undergo such an irregularity of speed of rotation as to cause a variation of one-fourth of its own individual current above or below its normal amount, the normal tension of the current generated by the whole series of machines will suffer a variation of one-fourth of one-fifth, or one-twentieth only.

If the armatures of all the machines were positively geared to a common driving-shaft and rotated in unison a variation in the speed of rotation of one machine would be accompanied by a like irregularity in the speed of all the other armatures, and the variation in the tension of current of all the machines in series would be fully commensurate with the irregularity of rotation in any one machine, precisely as though one machine alone were employed. In fact, several machines positively geared together would amount to only one machine with its parts multiplied. It is, therefore, upon the mode of connecting and driving the several armatures so that they shall not rotate in unison, and so that an irregularity in the speed of rotation of one armature shall not be accompanied by any variation or irregularity of rotation in the armatures of the other machines that my invention depends.

Rotation of the several armatures not in unison is to be understood to convey the idea that the armatures are each independently rotated with respect to all the others, and such independence of rotation is accomplished by placing each armature upon a separate shaft, rather than by placing all of the armatures of the series of machines rigidly upon a single shaft. It is apparent from this arrangement that the armatures will all revolve in slightly-varying times, owing to the difference in slippage of the several driving-belts. This mode of connecting the armatures of the several machines to the driving motor or motors I accomplish by friction or belt gearing.

My invention also embraces as an essential element of it a series of dynamo-electric machines, the field-of-force magnetism of which series is maintained by electricity generated by an auxiliary dynamo-machine.

By this device I am enabled to eliminate a great portion of the internal resistance of the generators, and so far, in fact, that the internal resistance shall only be due to the armature-wire together with that offered by the commutators, whereas if the field of force were not maintained by an auxiliary machine or generator it is obvious the internal resistance of the series of generators would be much greater and equal to the resistance of the wire upon the armatures plus the resistance of the commutators, plus the resistance of all the wire wound upon the cores of the field-magnets.

Now, for telegraphic purposes, where a series of dynamo-machines is employed to charge many lines of different lengths, it becomes a matter of great importance to reduce the internal resistance of the generator to zero as nearly as possible.

Let it be supposed that a generator has no internal resistance; and that it be used to charge a hundred lines. Such being the conditions, the current of the generator will flow over the hundred different branch lines in quantities inversely proportional to the respective resistance of the various branches, and if all of the branches are complete the strength of current on each branch will be a definite fixed amount. Let it be supposed, however, that all of the branch circuits are broken excepting one, the question arises whether the current of this single branch will be greater than if the current from the generator could distribute itself over the other ninety-nine branches.

It is well understood by electricians if the internal resistance of the generator be reduced to zero that the strength of current on any one branch line will be the same whether the other branches are open or closed, and in fact if the opposite poles of the generator were joined by a conductor of exceedingly small resistance, such conductor could not in any manner weaken the current of another line of very great resistance, nor would the opening and closing of the branch with little resistance serve to increase or decrease the current upon the branch or branches of great resistance, a result following from the fact that a decrease of the external resistance of a generator having no internal resistance is accompanied with a proportional increase in the amount of current generated. It will therefore be observed that where a single generator, as a series of dynamo-machines, is employed to charge many different lines of widely-differing lengths, it is necessary to so design the generator that the lines will always be charged the same, whether the current be concentrated on one line or be distributed upon a great number. To accomplish this result, the internal resistance of the generators must be rendered as small as possible, which is very nearly effected by eliminating from the internal resistance the resistance of the field-wire of the several machines.

In other parts of this specification I have fully described the advantage of several dynamo-machines over a single one for the purpose of developing currents subject only to slight variations. However, by employing several machines instead of one the internal resistance would be increased, and it therefore becomes highly essential that the field-magnets of the series be included in a circuit wholly independent of the circuit for charging the telegraph-lines. The problem, therefore, resolves itself to the necessity of employing a series of dynamo-generators in a manner that the fluctuation of current may be rendered slight, that the electro-motive force may be great, and also that the internal resistance may be reduced to its minimum possible amount.

It is apparent from the foregoing that a series of dynamo-machines, instead of a single one, is indispensable in fulfilling these conditions, and furthermore that the wire of the field-magnets be not included in the internal resistance of the series of generators. For this reason I consider a series of dynamo-generators whose field magnetism is maintained by electricity developed by an auxiliary dynamo-machine an important element of my invention.

I am aware that it is not new to energize the field-magnets of a single dynamo-machine by means of an auxiliary generator, and I make no claim thereto, as it is of particular importance in my system to employ a series of generators, as above described. It at the same time becomes necessary to maintain the field magnetism from an independent source, and the reason for maintaining the field magnetism in a series of machines for telegraphic purposes is very different from the reason for maintaining the field-magnets of a single machine, as has heretofore been done. In fact there is a change of form with a new result accomplished, to wit, a generator in which fluctuations of current are avoided of great electro-motive power and of such little internal resistance that of a great number of lines charged by the series they may be worked one at a time or all together without the slightest disturbance. How well this may be accomplished will be more readily seen from a single example.

Let it be supposed that the series of generators has an internal resistance of about one ohm, and that it is employed to charge a series of one hundred branch lines, each of a resistance of one thousand ohms; and suppose each of the series of five machines to have a generative capacity of seventy volts. The electro-motive force of the whole series will then be three hundred and fifty volts. Now if the current of the generator may distribute itself over all of the one hundred branches the external resistance will be only ten ohms.

The external and internal resistances will be eleven ohms, whence the strength of current from the generator will equal $\frac{350 \text{ volts}}{11 \text{ ohms}} = 31.818$ webers. Now, if a conductor carrying a strength of current of 31.818 webers be divided into a hundred equal branches, the strength of current on each branch will equal $\frac{31.818}{100} = .31818$ webers, when all of the lines are simultaneously charged. If all of the lines are broken but one the current of 350 volts will be concentrated upon a single line having an internal resistance of one ohm and an external resistance of 1,000 ohms. The current strength will therefore equal $\frac{350 \text{ volts}}{1001 \text{ ohms}} = .3499 +$ webers when only one of the hundred lines is charged, showing an increase of current strength, when the charge is concentrated on one line alone rather than distributed over all, of .3499+webers−.318 webers=.032 webers. This change is so very slight that it may be ignored, and as this is the extreme difference that may possibly occur it is apparent that a great number of lines charged by a series of machines, as above described, may be worked all simultaneously or singly without difficulty.

An important and further necessity for energizing the field-magnets from a supply independent of the currents generated by the armatures of the series exists in the fact that if the field-magnets were energized by the currents accumulatively from the machines in series any irregularity in the speed of the armatures would cause a variation in the strength of current and consequently in the strength of field magnetism. Now, as the current generated is proportional to the strength of the field as well as proportional to the speed of rotation, it is apparent that the fluctuations would be due to the product of speed of rotation and the field strength. For example, let the speed of rotation be diminished by one-fourth, supposing the field to remain constant. Again, let the speed of rotation remain constant while the field is weakened by one-fourth. In both these cases the currents will diminish by one-fourth; but now if the currents are produced in the armatures to charge each field, respectively, of the series, a decrease in the speed of rotation in any machine of one-fourth will be accompanied by a decrease in the strength of field magnetism of one-fourth, and the current then produced will be only nine-sixteenths of its original amount. It is therefore apparent that the currents due to the individual machines of the series are much more uniform when the field is maintained by an independent source than accumulatively by the currents of the machines themselves.

In recapitulating, it may be observed, first, that by maintaining the field magnetism by an auxiliary and independent generator the currents of individual machines are rendered very uniform; second, that by maintaining field magnetism by an independent generator the internal resistance of the series is reduced to its minimum; third, that by employing a series of machines, instead of a single one, the fluctuations of current are rendered very slight. By this means it is apparent the several armatures, being mounted on independent shafts and driven through the medium of friction or belt gearing, are quite independent of each other in rotating.

Referring to the accompanying drawings, which represent a combination or series of dynamo-electric machines for the purpose above mentioned, let 1, 2, 3, 4, and 5 represent dynamo-electric machines, the amatures of which are in a single circuit and contribute all together in developing a current of high tension.

The field-of-force electro-magnets of machines of the series 1, 2, 3, 4, and 5 are rendered magnetic by currents of electricity generated by an auxiliary dynamo or magneto electric machine, A, operated exclusively for this purpose.

As shown in the drawings, currents from machine A pass over conductors *d d d d*, through the field-coils of machines 1, 2, 3, 4, and 5, and back to machine A by conductor *f*, thereby polarizing the field-cores *e* of the several machines.

When magneto-electric machines are employed in series 1, 2, 3, 4, and 5, the auxiliary machine A is of course unnecessary.

*g g* represent driving-pulleys upon the armature-shafts of the machines, by means of which and suitable belting power from an ordinary motor may be communicated to the armature.

*b* and *c* are binding-posts from which wires are led to the telegraphic apparatus to be operated and the ground-connections, respectively.

The operation of this system is as follows: If motion is imparted to the several armatures through the belting and pulleys *g g*, a current will be generated by armature of machine 1, which will pass on its way to line through all of the other armatures. Machine 2 will generate an additional current, which will re-enforce the current in tension of machine 1 and pass through the armatures of all the other machines. Such will be the operation of all the machines, and they will all conspire in the development of a strong tension-current. Now, should the belt of the pulley of machine 1 slip to an extent to cause a perceptible weakening of its current, the currents generated by machines 2, 3, 4, and 5 will remain the same as before. Therefore, if from the slip of the belt of machine 1 its current fall away by one-fourth, the aggregate tension of current produced by all the machines will be nineteen-twentieths of the normal tension, or a variation will be the consequence of one-twentieth, whereas if a single machine were alone employed a slip of its belt would cause a much greater irregularity.

I do not limit myself to any particular number of generators to be employed in series to produce the main current, but propose to use as many as various conditions may require.

Having thus described my invention, what I claim, and desire to secure by Letters Patent, is—

1. A series of dynamo-electric machines whose field magnetism is maintained by an auxiliary generator, as described.

2. A series of two or more dynamo or magneto-electric machines, the armatures of the several machines being driven independently of each other and connected together in tension in a single circuit, so that the current generated by the armature of any one machine will flow directly through armatures of the other machines.

3. A series of independently-rotated armatures connected together in a single circuit for tension, whereby the aggregate current of all the machines is only slightly varied by a marked increase in the current generated by any single machine.

4. A series of two or more magneto or dynamo electric machines, the several respective armatures of the machines each being rotated independently of the others and not in unison, whereby a marked increase or decrease in the velocity of rotation of one armature will not necessarily be accompanied by an increase or decrease in the velocity of rotation of the armatures of the other machines.

5. A series of dynamo-electric machines whose field-magnets are maintained by the exterior circuit of a single machine in which the armatures are revolved independently of each other and not in unison.

6. In a system of dynamo-electric machines, the combination, with a series of dynamo-electric generators having a line or other wire, of the auxiliary dynamo-electric machine connected to the adjoining one of the series by a conductor, *d*, and each generator to a succeeding one by a similar conductor, *d*, with a circuit-returning conductor, *f*, between the auxiliary and the other generators, substantially as and for the purpose set forth.

STEPHEN D. FIELD.

Witnesses:
R. S. GUERNSEY,
WM. ARNOUX.